United States Patent
Kessel et al.

(10) Patent No.: US 10,212,094 B2
(45) Date of Patent: Feb. 19, 2019

(54) AUDIO DATA PROCESSING

(71) Applicant: NXP B.V.

(72) Inventors: Martin Kessel, Dresden (DE);
Sebastian Bohn, Dresden (DE);
Matthias Schattka, Dresden (DE)

(73) Assignee: NXP B.V., Eindhoven (NL)

( * ) Notice: Subject to any disclaimer, the term of this patent is extended or adjusted under 35 U.S.C. 154(b) by 135 days.

(21) Appl. No.: 15/252,034

(22) Filed: Aug. 30, 2016

(65) Prior Publication Data
US 2017/0093733 A1    Mar. 30, 2017

(30) Foreign Application Priority Data

Sep. 28, 2015    (EP) ..................... 15187134

(51) Int. Cl.
| | |
|---|---|
| *H04L 12/823* | (2013.01) |
| *H04L 12/927* | (2013.01) |
| *H04L 12/879* | (2013.01) |
| *H04H 40/18* | (2008.01) |
| *H04H 20/20* | (2008.01) |

(52) U.S. Cl.
CPC ............ *H04L 47/32* (2013.01); *H04H 40/18* (2013.01); *H04L 47/806* (2013.01); *H04L 49/901* (2013.01); *H04L 49/9026* (2013.01); *H04H 20/20* (2013.01)

(58) Field of Classification Search
None
See application file for complete search history.

(56) References Cited

U.S. PATENT DOCUMENTS

| | | | | |
|---|---|---|---|---|
| 5,852,612 | A * | 12/1998 | Kostreski | H04H 20/18 370/537 |
| 2003/0165330 | A1* | 9/2003 | Ju | H04N 5/85 386/355 |
| 2007/0177701 | A1* | 8/2007 | Thanigasalam | H04J 3/062 375/372 |
| 2008/0019467 | A1 | 1/2008 | He | |
| 2010/0027719 | A1* | 2/2010 | Pahuja | H04H 60/12 375/340 |
| 2013/0003904 | A1* | 1/2013 | Elenes | H04H 40/18 375/350 |
| 2013/0279700 | A1 | 10/2013 | Whitecar et al. | |
| 2013/0322557 | A1 | 12/2013 | Poulain et al. | |

OTHER PUBLICATIONS

Extended European Search Report for Patent Appln. No. 15187134.0 (dated Mar. 30, 2016).

* cited by examiner

*Primary Examiner* — Christine T Duong
(74) *Attorney, Agent, or Firm* — Rajeev Madnawat

(57) ABSTRACT

An apparatus and method are provided. A first buffer is configured to store a first packet stream, the first buffer comprising a first read pointer pointing to a first position in the first packet stream. A second buffer is configured to store a second packet stream. The second packet stream corresponds to the first packet stream and the second buffer comprises a second read pointer. A controller is configured to determine a second position in the second packet stream that corresponds to the first position in the first packet stream and adjust the second read pointer to point to the second position.

14 Claims, 4 Drawing Sheets

AUDIO DATA PROCESSING

FIELD

This invention relates to the processing of broadcast data and in particular but not exclusively to the process of broadcast audio data from multiple sources.

CROSS-REFERENCE TO RELATED APPLICATIONS

This application claims the priority under 35 U.S.C. § 119 of European Patent application no. 15187134.0, filed on Sep. 28, 2015, the contents of which are incorporated by reference herein.

BACKGROUND

Some modern broadcast receivers are designed to support multiple audio inputs from different broadcast domains. For example end user content (such as a radio show) may be received via audio inputs from domains such as frequency modulation broadcasting (FM), digital audio broadcasting (DAB) and/or Internet radio. These audio inputs may not normally be aligned in time with respect to the end user content and the audio inputs may further have system-immanent jitter.

It may be a requirement for the broadcast receiver to switch from one audio input to another, for example an input may be lost when the receiver moves out of range of the input's source. Due to the misalignment, the transition may not be seamless. In some systems the audio inputs may be processed to calculate a delay between two or more of the audio input. This delay may be applied to the audio inputs to attempt to align the end user content across the audio inputs.

Embodiments of the present application may be concerned with the quality of such alignment.

SUMMARY

According to the first aspect of the present disclosure, there is provided an apparatus comprising: a first buffer configured to store a first packet stream, the first buffer comprising a first read pointer pointing to a first position in the first packet stream; a second buffer configured to store a second packet stream corresponding to the first packet stream, and comprising a second read pointer; and a controller configured to determine a second position in the second packet stream that corresponds to the first position and adjust the second read pointer to point to the second position.

The controller may be further configured to determine a correspondence between the first packet stream and the second packet stream. The first pointer may point to a position in a first packet of the first packet streams and the second pointer may point to a corresponding position in a corresponding packet of the second packet.

The controller may be further configured to determine that a first packet of the first packet stream corresponds to a second packet of the second packet stream when a difference in receive times of the first and second packets is less than a predetermined value. The predetermined value may be the time taken to receive one packet on the first or second packet streams. The predetermined value may be a maximum offset between the packet streams.

Each packet of the first packet stream and each packet of the second packet stream may comprise an indication of the time at which the respective packet was received. The controller may be configured to lock the second read pointer to the first read pointer after the second read pointer have been adjusted. The second read pointer may be adjusted in respond to a request for data in the second buffer. The apparatus may further comprise one or more further buffers, wherein each of the further buffers may be configured to operate in accordance with the second buffer.

According to a second aspect, there is provided a receiver comprising: the apparatus of any preceding claim where the first and second packet streams comprises corresponding broadcast content; and a processor configured to read the first and second packet streams from the first and second buffers and determine a delay between the broadcast content in the first packet stream and the corresponding broadcast content in the second packet stream.

The processor may be further configured to delay one of the first and second packet stream by the determined delay to align the broadcast content in the first and second packet streams. The processor may be configured to determine the delay in dependence on a broadcast correlation algorithm.

According to a third aspect, there is provided a method comprising: storing a first packet stream in a first buffer having a first read pointer pointing to a first position in the first packet stream; storing a second packet stream corresponding to the first packet stream in a second buffer, the second buffer having a second read pointer; determining a second position in the second packet stream that corresponds to the first position; and adjusting the second read pointer to point to the second position.

The method may further comprise: determining a correspondence between the first packet stream and the second packet stream. The first pointer may point to a position in a first packet of the first packet stream and the second pointer may point to a corresponding position in a corresponding packet of the second packet. The method may further comprise: determining that a first packet of the first packet stream corresponds to a second packet of the second packet stream when a difference in receive times of the first and second packets is less than a predetermined value. The predetermined value may be the time taken to receive one packet on the first or second packet streams. The predetermined value may be a maximum offset between the packet streams.

Each packet of the first packet stream and each packet of the second packet stream may comprise an indication of the time at which the respective packet was received. The method may further comprise: locking the second read pointer to the first read pointer after the second read pointer has been adjusted. The second read pointer may be adjusted in response to a request for data in the second buffer. The method may further comprise carrying out the method steps concerning the second buffer with respect to one or more further buffers.

The first and second packet streams may comprise corresponding broadcast content, the method may further comprising: reading the first and second packet streams from the first and second buffers; and determining a delay between the broadcast content in the first packet stream and the corresponding broadcast content in the second packet stream. The method may further comprise delaying one of the first and second packet stream by the determined delay to align the broadcast content in the first and second packet streams. The method may further comprise determining the delay in dependence on a broadcast correlation algorithm.

FIGURES

Embodiments will be described, by way of example only, with reference to the drawings, in which.

It will be appreciated that for features that span more than one drawing like reference numerals indicate the like feature.

DETAILED DESCRIPTION

The following embodiments may be described with reference to packet streams carrying audio data. This has been done for ease of explanation only and it will be appreciated that at least some embodiments may be applicable to other types of broadcast or streaming data, for example video data. It will be appreciated that here the term broadcast is intended to cover packet streams broadcast from one entity to multiple other entities as well as packet stream broadcast from one entity to a specific few or a particular one other entity. For example, the broadcast packet stream may be a unicast stream.

Figure 1:
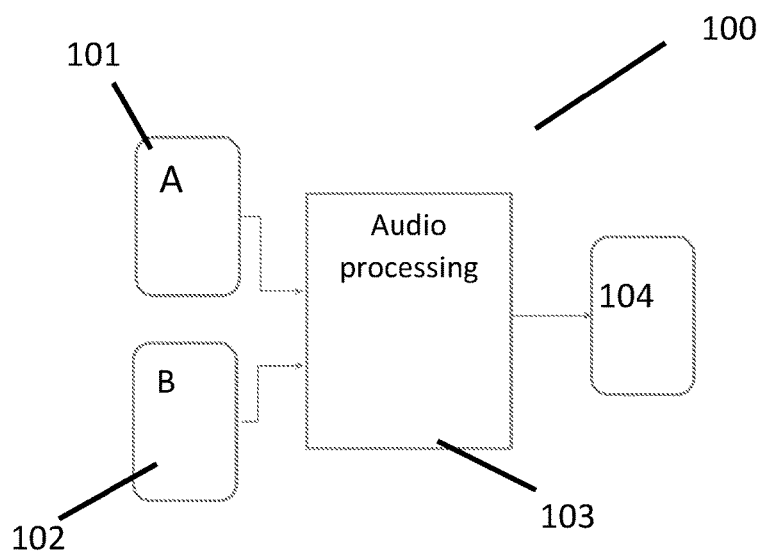
FIG. 1 is an example schematic of a receiver.

FIG. 1 shows an example of a broadcast receiver 100 having a plurality of audio inputs carrying audio content. The receiver 100 may receive a first audio input from a first source A 101 and a second audio input from a second source B 102. The first and second audio inputs 101 and 102 may comprise audio signals being broadcast from the respective sources A and B and received at the receiver 100. The first and second sources 101 and 102 may broadcast the same audio data or content, for example in the form of a radio show, however may broadcast the data in accordance with their type. For example source A 101 may be an FM transmitter and may transmit the data accordingly and source B may be a DAB transmitter and broadcast the data accordingly. In such a case, the data or end-user content may be misaligned in time due to various characteristics of the transmitters 101 and 102.

The transmissions from the first and second sources 101 and 102 may be provided to an audio processor 103 of the receiver 100. The audio processor 103 may be configured to calculate a delay in time between the data or content carried in the first audio input and the second audio input. This value of delay may be used to adjust one of the audio inputs by the delay so that the content of the first and second audio input is aligned. It will appreciated that in some cases, the audio processor 103 may carry out further processing on one or both of the audio inputs.

The receiver 100 may further comprise an output module 104, which may receive a processed version of one of the audio inputs from the audio processor 103. In one example, the processed audio input provided to the output module, may be further provided as an audio signal to a user.

The receiver 100 may decide to switch from the one source of the audio data or content to another source, for example a switch between providing the audio data from the first source 101 to providing the audio data from the second source 102 to the user. This may be done for example in response to a user preference of source or signal characteristic of the sources 101 and 102. In this case, the processed audio data from the second audio input may be provided to the output module instead of the processed audio data of the first source.

Aligning the audio content of the first and second audio inputs may make the transition from the audio data from the first source 101 to the audio data from the second source 102 less noticeable.

In the example of FIG. 1, the delay between the audio inputs of the two sources may be calculated and then applied to delay the audio input of the source that is ahead. This delay calculation may be done through an audio correlation algorithm. Audio correlation algorithms may require some time to find a reliable delay value.

However, even if the delay between the audio content was calculated and one or more of the audio inputs were delayed accordingly, the first and second audio signals may still not be exactly aligned at the time of transition and/or crossfading between the sources. This is because the adjusted audio inputs may become progressively more misaligned with time since the last delay calculation due to jitter present on the audio inputs. This jitter may have various causes, for example may be source-immanent content jitter, source availability jitter caused by processing delays, jitter inherent in the system design and/or other sources of jitter.

User interaction with a receiver that interrupts audio streams (e.g. switching frequencies or services) may require storing and recalling this calculated delay value. As reasons for switching between inputs may occur at any time (especially for mobile receivers), there may not be enough time to recalculate and adjust input delays. Hence, non-seamless switching may be experienced, as this only falls back to the most recent calculation of delay between the inputs.

Embodiments of the present application attempt to address this presence of jitter in order to move the switching of sources to a more seamless experience for the user. Embodiments may address this issue by providing a buffer for each of the audio inputs and adjusting one or more read pointers associated with the buffers to align the audio inputs with respect to jitter.

Figure 2:
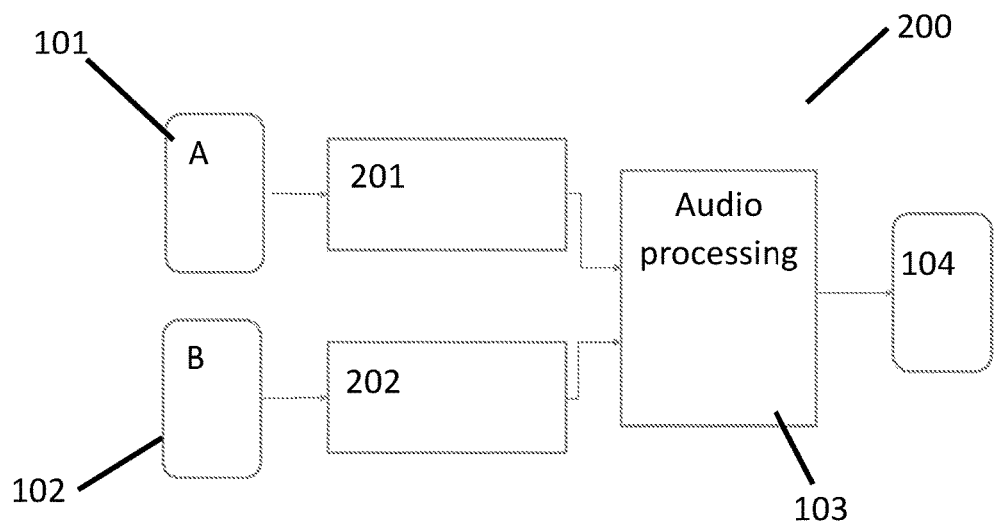
FIG. 2 is a schematic diagram showing an example of a receiver in accordance with an embodiment.

FIG. 2 shows an example of a receiver 200 in accordance with the present application.

FIG. 2 shows a receiver 200, a first audio data source 101 and a second audio data source 102. The receiver 200 may comprise an audio processor 103 and an output module 104. The first and second audio sources 101 and 102 may be configured to transmit audio content via respective first and second audio inputs to the receiver 200. The audio processor 103 may be configured to receive the audio inputs and calculate an audio content delay between the audio inputs. The audio processor 103 may further apply the calculated delated to one or more audio inputs that are ahead in order to align the audio content of the audio inputs. The output module 104 may receive a processed audio input from the audio processor 103 and, in some examples, provide the audio content to a user.

The receiver 200 may further comprise a first buffer 201 coupled to receive the first audio input from the first source 101 and a second buffer 202 coupled to receiver the second audio input from the second source 102. The first and second buffers 201 and 202 may provide the respective buffered first and second audio inputs to the audio processor 103.

The first and second audio inputs may comprise respective first and second packet streams, each comprising a plurality of packets. The packets of the first packet stream may be stored in the first buffer 201 and the packets of the second packet stream may be stored in the second buffer 202. Additionally, packets of the first packet stream may be considered to correspond to packets in the second packet stream. This correspondence may be for example based on a time at which the packets were received at the receiver 200. Each of the buffers may have a read pointer which points to a position in the buffer from which data is read by the audio processor 103 and a write pointer indicating a position in the buffer to which data from the respective audio input is written.

It will be appreciated that due to jitter, the first and second packet streams will not be exactly aligned and thus the data stored in the buffers will not be exactly aligned. The buffers 201 and 202 may allow a read pointer of a buffer to be adjusted with respect to jitter. This may allow the read pointers of the first and second buffers to point to corresponding data in the buffer even if that corresponding data is stored at non-corresponding positions within the buffer.

It will be appreciated that data packets within the packet streams are considered to correspond in dependence on their receive time. The corresponding data packets do not necessarily contain corresponding content, as the data streams may be aligned for content at a later stage by the audio processor 103.

Figure 3:
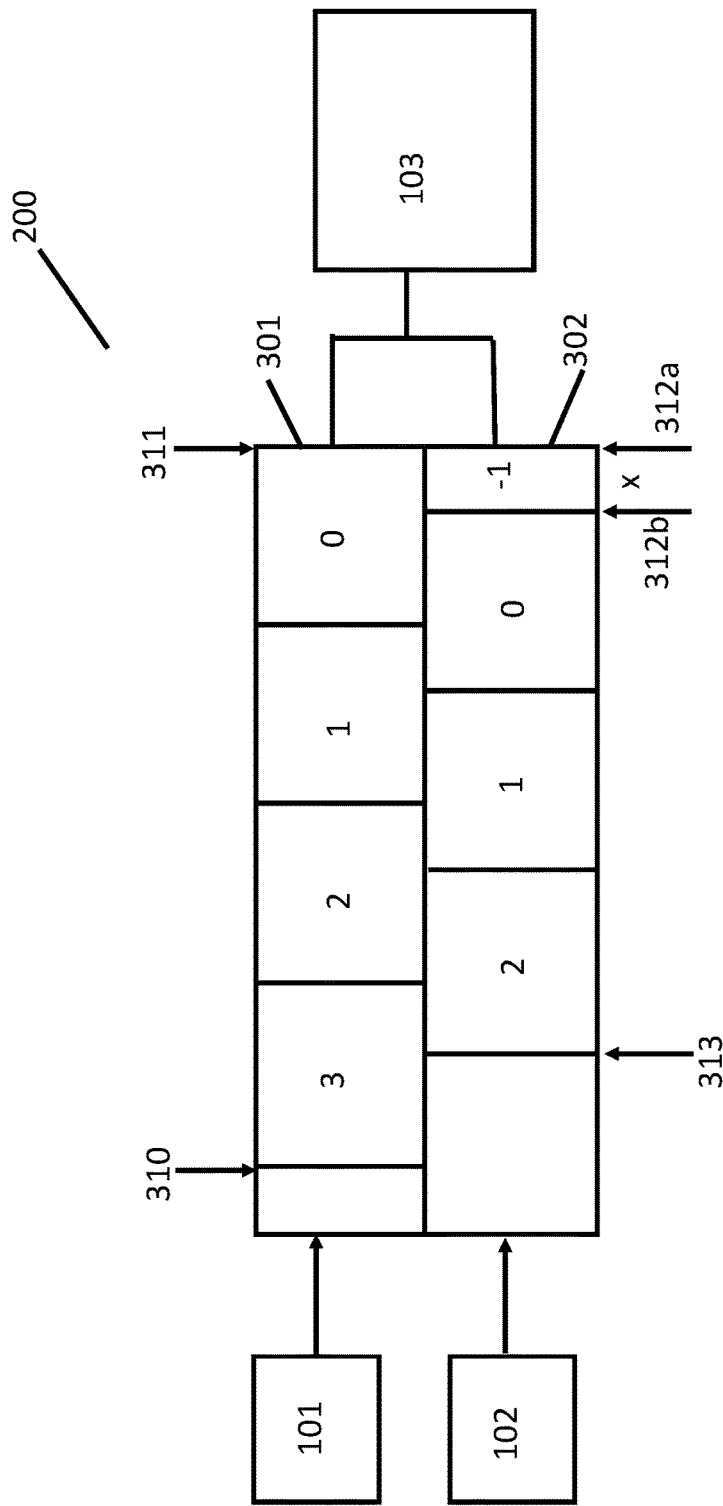
FIG. 3 is a schematic diagram showing a further example of a receiver in accordance with an embodiment.

FIG. 3 shows an example of data packets stored in the first and second buffers as well as the alignment of a read pointer.

FIG. 3 shows an example implementation of the receiver 200. FIG. 3 shows the first source 101, second source 102 and receiver 200. The receiver 200 comprises a first buffer 301 configured to receive and buffer the first packet stream from the first source 101 and a second buffer 302 configured to receive and buffer the second packet stream from the second source 102. An output of the first and second buffers 301 and 302 are coupled to the input of the audio processor 103. In the example of FIG. 3, the output module 104 is not shown.

It will be appreciated that the first source 101 may broadcast the first packet stream and the second source 102 may broadcast the second packet stream and the first and second packet streams may be received by the receiver 200.

At a start time $t_0$, the first buffer 301 may begin to store packets received on the first packet stream. For purposes of illustration, the first buffer is shown at storing packets 0 to 3 of the first packet stream. In this example, the start time $t_0$ is aligned to a start time of a first packet 0 of the first packet stream and that packet is stored at the next available space in the first buffer 301. In this example, the next available space is the start of the buffer but it will be appreciated that the next available space may be at any point in the buffer 301 indicated by the write pointer 310 of the first buffer 301.

At the start time $t_0$, the second buffer also starts to store the packets of the second packet stream. However, due to jitter in the system, the time at which a first packet 0 of the second packet stream is received by the second buffer is offset by a time value Δ. At time $t_0$, a packet −1 is being received on the second packet stream and is stored in the second buffer 302. At a time $t_0+\Delta$, the first packet 0 of the second packet stream is received and stored in the buffer 302. From FIG. 3 it can be seen that the position of the packets 0, 1 and 2 of the second packet stream are offset in the second buffer 302 with respect to the position of the corresponding packets 0, 1 and 2 of the first packet stream in the first buffer 301. This is due to the time offset Δ caused by jitter.

Each of the buffers comprise a read pointer 311, 312 to indicate a next position from which data is to be read and a write pointer 310, 313 to indicate a next position to which data is to be written. The write pointers 310, 313 may be updated as the data streams are written to the buffers. One of the buffers 301, 302 may be selected as a master buffer with the other buffer being a slave buffer. In this case, the first buffer 301 may be selected as the master buffer and the second buffer 302 may be selected as a slave buffer. The first read pointer 311 may therefore be a master read pointer and the second read pointer 312 may be a slave read pointer. The buffers 301 and 302 may operate so that the read pointers of the buffers are synchronised. In particular, the slave read pointers may be synchronised or locked to the master read pointer. As the master read pointer is moved, the slave read pointers may be moved by the same amount.

Initially the read pointers 311, 312a may point to a corresponding position within the buffer. In the example of FIG. 3, it is assumed that the buffers 301 and 302 are empty at t0 and the audio processor 103 has not yet read any data from either of the buffers 301 and 302. The first read pointer 311 of the first buffer 301 thus points to a first position in the first buffer, in this case the first position is the start of the buffer. The second read pointer 312a of the second buffer points to a first position in the second buffer 302, in this case the first position is the start of the buffer.

However, due to jitter, while the first read pointer 311 and the second read pointer 312a point to corresponding positions in the first and second buffers 301 and 302 (in this case the start of the buffers) they are not pointing to corresponding positions in the first and second packet streams. It can be seen that the first read pointer points to the start of a packet 0 while the second read pointer 312a points to mid-way through a packet −1. Thus when the packet streams are read from the first and second buffers 301 and 302, the start times of the packets from the respective streams may not be aligned.

In the example of FIG. 3, the second read pointer 312a may be adjusted to take into account the misalignment of the first and second packet streams. The master read pointer 311 may point to a first position with respect to the first packet stream. A second position with respect to the second packet stream may be determined that corresponds to the first position with respect to the first packet stream and the second read pointer 312a may be adjusted to point to this second position. The adjusted read pointer is shown by read pointer 312b.

For example, the first read pointer 311 may point to a first position in the first data stream, for example it may point to the start of data packet 0. A second position in the second data stream may be determined, where the first and second positions correspond in their respective data streams. For example the second position may be determined as the start of the data packet 0 in the second data stream because the packet 0 of the first data stream and packet 0 of the second data stream correspond. The second read pointer may be adjusted to point to the second position in the second data stream corresponding to the first position in the first data stream.

It will be appreciated that the second read pointer 312a may be adjusted to read pointer position 312b by a buffer offset x caused by jitter. The first read pointer 311 and the adjusted second read pointer 312b may be locked or synchronised so that they are adjusted synchronously.

In this example, instead of pointing to the same position with respect to the buffer, the first and adjusted second read pointers point to the same position with respect to the first and second packet streams.

In some examples, the audio processor 103 may read the packet streams from the first and second buffers 301 and 302 and determine an alignment of the audio content within the packet streams. The audio processor 103 may calculate a delay between the streams and delay the packet stream that is ahead so that aligned audio content from the packet streams is available. In some cases, the audio processor may calculate the delay using an audio correlation algorithm and determining an accurate delay may take a period of time. During this period of time, jitter in the incoming packet streams may cause the delay between the audio content of those streams to change. For example the jitter may cause a frequency drift which may cause the delay between audio content to change.

In the example of FIG. 3, an offset between the incoming packet streams caused by jitter is removed so that the delay calculated by the audio processor may be valid for a longer period. It will be appreciated that the packet streams may be determined to correspond in dependence on the time at which the packets are received and the audio content of those packets may not necessarily correspond.

Figure 4:
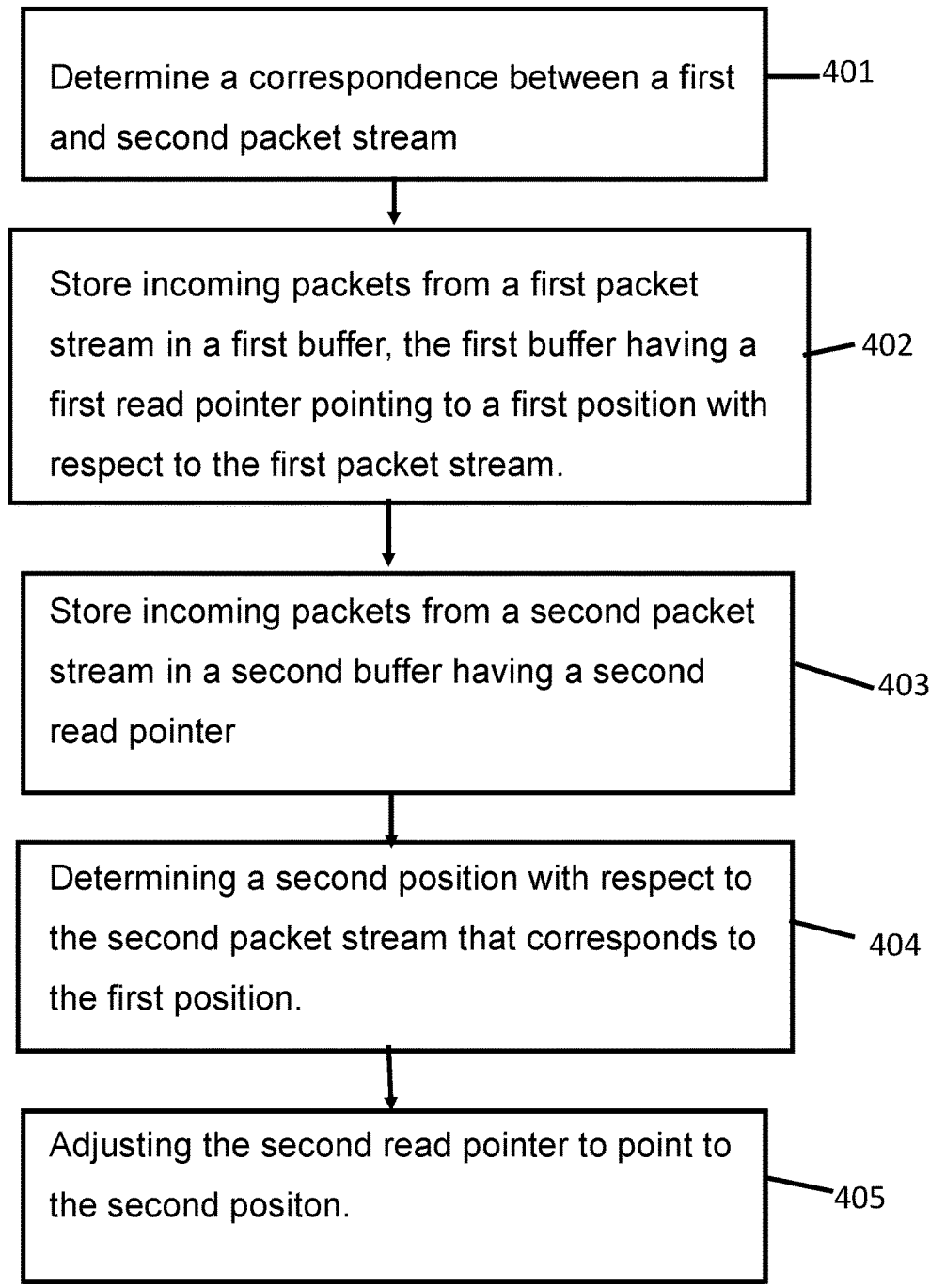
FIG. 4 is a flow diagram depicting the method steps carried out in accordance with an embodiment.

FIG. 4 is a flow diagram depicting the method steps carried out in some examples.

At step 401, a correspondence between a first incoming packet stream and a second incoming packet stream is determined. In some examples, the correspondence is determined by a buffer controller however it will be appreciated that the correspondence may be determined by another entity or controller in other examples. The correspondence may be determined by the time at which packets of the respective streams are received. For example a first packet on the first packet stream may be considered to correspond to a second packet on the second packet stream if the difference between the respective times at which each packet is received is less than a specified period. This specified period may correspond to a time taken to receive a packet, for example the time taken from receiving a start of the packet to the end of the packet. In additional or further examples, the specified period may correspond to a maximum time offset that may be caused by jitter.

In some examples, corresponding packets may be marked with an indication, for example a number or identity that they correspond. In the example of FIG. 3, the packets may be marked with the indications 0, 1, 2 and 3 that they correspond with corresponding packets having corresponding indications.

At step 402, the first packet stream is stored in a first buffer. In this example, the first buffer 301 is considered to be the master buffer. The first buffer 301 may comprise a first read pointer 311 that points to a first position with respect to the first packet stream.

At step 403, the second packet stream is stored in a second buffer 302. In this example, the second buffer may be a slave buffer. The second buffer 302 may comprise a second read pointer.

At step 404, a second position with respect to the second packet stream is determined that corresponds to the first position. As a correspondence between the first and second packet stream is known, a position in the second data stream that corresponds to a position in the first data stream may be determined. For example, a position of a packet in the second packet stream corresponding to a packet in the first packet stream to which the first read pointer points may be determined.

At step 405, the second read pointer may be adjusted to point to the second position.

The audio processor 103 may then read data from the first and second buffers 301 and 302 and determine a delay corresponding to a delay in the audio content between the streams. The audio processor 103 may apply the delay to the stream that is ahead and thus aligned audio data streams are available to be switched between.

In the method of FIG. 4, it is shown that a determination of a correspondence between a first and second packet stream may be determined. An example in which this determination is made in dependence on the time of reception of the packets is described in relation to FIG. 5.

Figure 5:
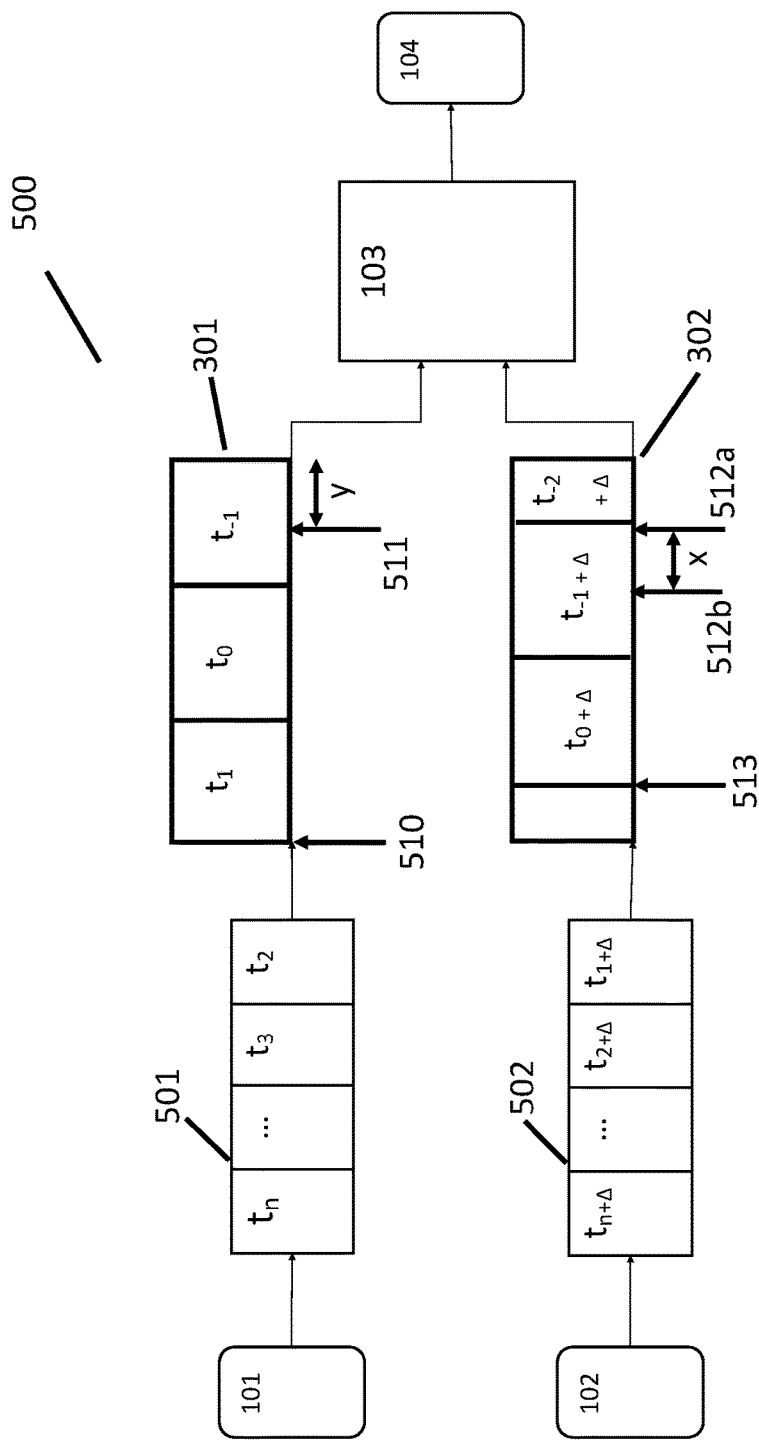
FIG. 5 is a schematic diagram showing a further example of a receiver in accordance with an embodiment.

FIG. 5 shows a receiver 500, first source A 101 and second source B 102. FIG. 5 further shows the first incoming packet stream 501, second incoming packet stream 502, first buffer 301, second buffer 302, audio processor 103 and output module 104.

In the example of FIG. 5, the first and second buffers 301 and 302 may be provided by first and second first in first out buffers (FIFOs). Each of the FIFOs comprises a read pointer and a write pointer. Additionally each FIFO may indicate its level of fill. The level of fill of the FIFO may be considered to be the position of the write pointer minus the position of the read pointer—in other words how much data is available to be read from the FIFO. It will be appreciated that the FIFO may be implemented as a circular buffer where the read and write pointers wrap around to the start of the buffer when they reach the end of the buffer.

In FIG. 5, the packets of the first packet stream are marked with the time at which they were received at the receiver 500. In this example a first packet stream comprises packets received at $t_{-1}, t_0, t_1, t_2, t_3 \ldots t_n$. At the time shown in FIG. 5, the packets of the first packet stream received at time $t_{-1}$, $t_0$ and $t_1$ have been written to the FIFO 301. The incoming first packet stream 501 indicates that further packets arrive at $t_2, t_3$ to $t_n$.

A master read pointer 511 points to a first position in the first packet stream—in this case a position part-way through the stored packet $t_{-1}$ The master pointer 511 additionally corresponds to a position y in the first buffer. A master write pointer 510 points to the next position in the first FIFO 301 available to be written to.

The packets of the second data stream are also marked with the time at which they were received at the receiver 500. The arrival of the packets of the second data stream lags the arrival of the packets of the first data stream by an offset or delay $\Delta$. In this example a first packet stream comprises packets received at $t_{-2+\Delta}, t_{-1+\Delta}, t_{0+\Delta}, t_{1+\Delta}, t_{2+\Delta}, \ldots t_{n+\Delta}$. The incoming packets on the first and the second packet streams may be determined to correspond if the difference in their receive times is within a predetermined range. In this case, the difference in receive time between a packet $t_x$ on the first packet stream and a packet $t_{x+\Delta}$ on the second packet stream is $\Delta$. The predetermined period may be considered to be less than the length of a packet in time. For example the time taken between the receipt of a packet and receipt of the next consecutive packet in a packet stream (for example $t_1 - t_2$). In the example of FIG. 5, it may be determined that the packets $t_{-1}, t_0, t_1, t_2, t_3 \ldots t_n$ of the first packet stream correspond to the respective packets $t_{-1+\Delta}, t_{0+\Delta}, t_{1+\Delta}, t_{2+\Delta}, t_{3+\Delta} \ldots t_{n+\Delta}$ of the second packet stream where $\Delta$ is less than the predetermined period.

Thus, at time $t_{-1}$ when the first and second FIFOs 301 and 302 start storing the incoming data streams, packet $t_{-1}$ is present on the first packet stream while the packet on the second packet stream (packet $t_{-1+\Delta}$) corresponding to the packet $t_{-1}$ on the first packet stream has not yet arrived. Instead, part of a previous packet $t_{-2}$ is still available on the second packet stream and is stored in the second FIFO 302. The position of the packet $t_{-1+\Delta}$ in the second FIFO 302 does not correspond to the position of the corresponding packet $t_{-1}$ in the first FIFO 301. The read pointer 512b of the second FIFO 302 is adjusted to point to a position in the second packet stream that corresponds to the position in the first data stream pointed to by the master read pointer 511. This may mean adjusting the position of the read pointer 512a by an offset value x. The offset value x corresponds to the space in the second FIFO 302 filled during the time period Δ.

The first and second FIFOs 301 and 302 may be configured to provide their fill level. The fill level of the buffers may correspond to a difference between their respective read and write pointers. In this example the fill level of the master buffer 301 may be the position of the first read pointer 511 minus the position of the first write pointer 510. The fill of the second buffer 302 may be the position of the adjusted read pointer 512b minus the position of the write pointer 513. The position of the second read pointer 512b may differ from the position of the first read pointer 511 by an offset x. This offset may correspond to a portion of the buffer filled during the period Δ. In other words, where the first read pointer 511 points to a position y in the first buffer, the second read pointer 512b may point to a position (y+x) in the second buffer. The data stored at position y in the first buffer 301 may correspond to the data stored in the position (y+x) in the second buffer.

Each FIFO 301 and 302 may be configured to store more data than the sum of what is to be extracted at once, plus the jitter x to be equaled out. The FIFOs may be further configured to provide timing information of their content. In this case, the determination of the correspondence of the first and second packet stream may be made by the FIFO controller or other entity on the basis of the provided timing information. The FIFOs may further have an interface to obtain their data fill level.

In the foregoing, the adjustment of the read pointer of the second buffer has been discussed. In some cases, the delay Δ between the first packet stream and the second packet stream may be such that the second read pointer may be adjusted to point to a position in the second buffer to which data has not yet been written. In this case, the buffer may be configured to provide null values, for example zeroes. This case of "negative" fill levels may occur if the slave buffers adjusted read pointers are synchronized/locked to the master read pointer. If a synchronized buffer has insufficient data available while reading, it may automatically serves dummy data (e.g. zeroes) and its fill level may turn negative. Refilling negative fill levels may correctly insert new data by dropping already virtually read data if needed.

While embodiments have been described having a two sources with two packet streams and two buffers, it will be appreciated that in other embodiments, there may be more than two sources. As described above, one of the buffers 301 is selected as a master buffer. The remaining buffers and packet streams may all be treated as described in relation to the second source and buffer 302. In other words, read pointers of the remaining buffers may be adjusted to point at a position with respect to their further packet streams that corresponds to the position with respect to the first packet stream to which the master read pointer points. In examples, the slave buffers may align their packet streams to the master packet stream by adjusting their respective read pointers according to the master buffers read pointer. The read pointers of the slave buffers may lock to the master read pointer and be updated synchronously.

While it has been described that a read pointer to one or more of the slave buffers is adjusted, it will be appreciated that in some example the adjustment may take place in response to a request or indication that the data in that buffer is required. In some examples, the second read pointer may be adjusted in response to a request, for example from the audio processor, that the data stored in the second buffer is required. In the case of a system having multiple slave buffers, the read pointers of only one or of only a subset of the slave buffers may be adjusted in dependence on an indication of which of the slave buffers are storing the requested packet streams.

In some examples, the first and second packet streams may have the same sampling rate. In this case, the adjustment for jitter—for example the adjustment of a slave buffer read pointer, may synchronise the slave read pointer to the master read pointer for a period of time. In other examples, the packet stream in the master buffer may have a different sampling rate than the packet stream in the slave buffer(s). In this case, the adjustment of the slave read pointer may serve to synchronise the master and slave read pointers for a period of time shorter than if the packet streams were synchronised. This may however be useful to provide a longer period of validity for the delay value calculated by the audio processor 103.

The invention claimed is:

1. An apparatus comprising:
a first buffer configured to store a first packet stream, the first buffer comprising a master read pointer pointing to a first position in the first buffer and a first position in the first packet stream corresponding to the first position in the first buffer;
a second buffer configured to store a second packet stream corresponding to the first packet stream, and comprising a slave read pointer pointing to a first position in the second buffer; and
a controller configured to determine a second position in the second packet stream that corresponds to the first position in the first packet stream and adjust the slave read pointer to point to the second position in the second packet stream, wherein the controller is configured to lock the slave read pointer to the master read pointer after adjusting the slave read pointer.

2. The apparatus of claim 1, wherein the controller is further configured to determine a correspondence between the first packet stream and the second packet stream.

3. The apparatus of claim 1, wherein the master read pointer points to a position in a first packet of the first packet stream and the slave read pointer points to a corresponding position in a corresponding packet of the second packet stream.

4. The apparatus of claim 1, wherein the controller is further configured to determine that a first packet of the first packet stream corresponds to a second packet of the second packet stream when a difference in receive times of the first packet stream and the second packet stream is less than a predetermined value.

5. The apparatus of claim 4, wherein the predetermined value is a time taken to receive one packet on the first or second packet streams.

6. The apparatus of claim 4, wherein the predetermined value is a maximum offset between the packet streams.

7. The apparatus of claim 1, wherein each packet of the first packet stream and each packet of the second packet stream comprises an indication of a time at which the respective packet was received.

8. The apparatus of claim 1, wherein the slave read pointer is adjusted in respond to a request for data in the second buffer.

9. The apparatus of claim 1, comprising one or more further buffers, wherein each of the one or more further buffers are configured to operate in accordance with the second buffer.

10. A receiver comprising:
the apparatus of claim 1, wherein the first packet stream comprises broadcast content and the second packet stream comprises broadcast content corresponding to the first packet stream; and
a processor configured to read the first and second packet streams from the first and second buffers and determine a delay between the broadcast content in the first packet stream and the corresponding broadcast content in the second packet stream.

11. The receiver of claim 10, wherein the processor is further configured to delay one of the first and second packet stream by the determined delay to align the broadcast content in the first packet stream and the corresponding broadcast content in the second packet stream.

12. The receiver of claim 11, wherein the processor is configured to determine the delay in dependence on a broadcast correlation algorithm.

13. A method comprising:
storing a first packet stream in a first buffer having a master read pointer pointing to a first position in the first buffer and a first position in the first packet stream corresponding to the first position in the first buffer;
storing a second packet stream corresponding to the first packet stream in a second buffer, the second buffer having a slave read pointer pointing to a first position in the second buffer;
determining a second position in the second packet stream that corresponds to the first position in the first packet stream; and
adjusting the slave read pointer to point to the second position in the second packet stream, wherein a controller locks the slave read pointer to the master read pointer after adjusting the slave read pointer.

14. The method of claim 13, further comprising:
determining a correspondence between the first packet stream and the second packet stream.

* * * * *